United States Patent [19]

Biswas

[11] Patent Number: 5,842,546
[45] Date of Patent: *Dec. 1, 1998

[54] SPLIT BACKPLATE FOR NOISE SUPPRESSION IN BRAKE PAD ASSEMBLIES

[75] Inventor: Chandi Biswas, Prattville, Ala.

[73] Assignee: Prattville Manufacturing, Inc., Prattville, Ala.

[ * ] Notice: This patent issued on a continued prosecution application filed under 37 CFR 1.53(d), and is subject to the twenty year patent term provisions of 35 U.S.C. 154(a)(2).

[21] Appl. No.: 675,532

[22] Filed: Jul. 3, 1996

[51] Int. Cl.⁶ .............................. F16D 69/00; F16D 65/08
[52] U.S. Cl. ............... 188/73.37; 188/73.1; 188/250 E; 188/250 B; 188/251 R
[58] Field of Search ................. 188/73.1, 73.37, 188/251 A, 251 R, 251 M, 250 B, 250 G, 264 G, 218 A, 205 A, 250 A, 378–380, 250 E; 192/107 R, 107 C, 55.3, 55.2, 55.6, 70.17; 29/458; 267/136, 141, 141.1; 428/908.8, 141, 409, 443, 215

[56] References Cited

U.S. PATENT DOCUMENTS

| | | | |
|---|---|---|---|
| 2,809,130 | 10/1957 | Rappaport | 188/250 A |
| 3,503,475 | 3/1970 | Mione | 188/250 R |
| 3,563,347 | 2/1971 | Hahm . | |
| 3,885,651 | 5/1975 | Odier . | |
| 3,918,555 | 11/1975 | Rath . | |
| 3,966,026 | 6/1976 | Filderman . | |
| 4,093,045 | 6/1978 | Kawamura | 188/73.37 |
| 4,103,761 | 8/1978 | Filderman . | |
| 4,230,207 | 10/1980 | Stahl | 188/250 B |
| 4,240,530 | 12/1980 | Tillenburg . | |
| 4,373,615 | 2/1983 | Melinat . | |
| 4,569,424 | 2/1986 | Taylor, Jr. | 188/250 G |
| 4,660,685 | 4/1987 | Thacker et al. . | |
| 5,099,962 | 3/1992 | Furusu et al. . | |
| 5,355,986 | 10/1994 | Biswas | 188/258 |
| 5,407,034 | 4/1995 | Vydra et al. . | |
| 5,413,194 | 5/1995 | Kulis, Jr. et al. . | |
| 5,416,962 | 5/1995 | Passarella . | |
| 5,515,950 | 5/1996 | Kwolek | 188/250 E |
| 5,535,860 | 7/1996 | Hummel et al. | 188/250 B |
| 5,538,104 | 7/1996 | Katz et al. | 188/73.37 |

FOREIGN PATENT DOCUMENTS

| | | | |
|---|---|---|---|
| 540332 | 5/1993 | European Pat. Off. | 188/73.37 |
| 621414 | 10/1994 | European Pat. Off. | 188/250 E |
| 2375494 | 8/1978 | France | 188/73.37 |
| 2513131 | 9/1975 | Germany | 188/250 E |
| 3109992 | 9/1982 | Germany | 188/250 G |
| 3402866 | 9/1984 | Germany | 188/73.37 |
| 56-80534 | 7/1881 | Japan | 188/250 G |
| 52-54873 | 5/1977 | Japan | 188/250 E |
| 56-80532 | 7/1981 | Japan | 188/250 B |
| 57-134029 | 8/1982 | Japan | 188/250 B |
| 58-211032 | 12/1983 | Japan | 188/250 B |
| 59-47536 | 3/1984 | Japan | 188/73.37 |
| 63-101530 | 5/1988 | Japan | 188/264 G |
| 2125126 | 2/1984 | United Kingdom | 188/264 G |
| 2190968 | 12/1987 | United Kingdom | 188/250 G |
| 2202288 | 9/1988 | United Kingdom | 188/264 G |

*Primary Examiner*—Douglas C. Butler
*Attorney, Agent, or Firm*—St. Onge Steward Johnston & Reens LLC

[57] ABSTRACT

A brake pad assembly is provided having a split backplate design comprising a damping layer disposed between two metal plates which are mechanically fastened together such that the plates are slightly slidable relative to each other to allow independent vibration of the two plates. The two metal plates are provided with a ratio of the thickness of the plate farther from the friction material to the plate closer to the friction material of at least 1.50. The damping layer is formed of a non-compressible, non-metal, heat-resistant material such as glass fiber cloth, mineral fiber cloth, ceramic fiber cloth, aramid fiber cloth, or graphite fiber cloth, and preferably has a low coefficient of friction. The plates are mechanically fastened together by rivets, pins or the like.

2 Claims, 2 Drawing Sheets

SPLIT BACKPLATE FOR NOISE SUPPRESSION IN BRAKE PAD ASSEMBLIES

FIELD OF THE INVENTION

The invention relates to brake pad assemblies such as are used in automobile brake systems including disc brake systems, and more particularly, to a brake pad assembly which suppresses brake squeal or noise.

BACKGROUND OF THE INVENTION

In conventional brakes, particularly in disc brakes, sliding between the brake pad assembly and the disc rotor may cause vibration of the brake pad assembly and of other components of the brake system, resulting in squealing or other noise. A number of different solutions have been proposed for reducing such noise, including introduction of a shim element between the backing plate and the caliper, as well as various backplate assembly designs.

U.S. Pat. Nos. 3,918,555 to Rath, 4,660,685 to Thacker, and 5,413,194 to Kulis are directed to brake pad assemblies where a shim element is secured between the caliper and the face of the backing plate opposite the friction material.

Thacker '685 discloses a system wherein a resilient pad member is adhesively applied to the backing plate, with the caliper contacting the resilient pad member when the caliper is actuated to apply braking. Rath '555 discloses a similar noise reduction system wherein a locating strip is adhesively applied to the backing plate, the caliper, or both. Kulis '194 discloses a brake pad assembly in which the friction material, during manufacture, is allowed to flow through openings in the plate to form a layer of friction material on the face of the backing plate opposite the friction brake pad.

A disadvantage of these systems is that, since the caliper bears directly against the damping material, the damping layer is subjected to significant torsional and rotational forces which can degrade it and relatively rapidly impair its noise-damping effectiveness. With respect to Rath '555 and Thacker '685, the localized engagement of the caliper with the damping layer tends to locally compress it during braking operations, which can permanently deform it, and also tends to promote separation of the damping layer from the backing plate. With respect to Kulis '194, the presence of friction material on the back of the backing plate poses the risk of mechanical failure due to the repeated caliper loading.

U.S. Pat. Nos. 3,885,651 to Odier, 4,240,530 to Tillenburg, 5,407,034 to Vydra, 5,416,962 to Passarella, 3,966,026 and 4,103,761 to Filderman, 4,373,615 to Melinat, and 5,099,962 to Furusu each relate to brake pad assemblies wherein noise suppression is attempted through the use of various backplate modifications.

Odier '651 and Tillenburg '530 are directed to noise reduction systems wherein a layer a resilient material, such as rubber, is sandwiched between the backing plate and a second metal plate. The damping material and second plate are held in place by an adhesive.

A disadvantage of these prior art systems is that the adhesive bond between the layers may weaken at the high temperatures often encountered in heavy braking situations. This weakening of the adhesive bond, coupled with the high shear stresses on the brake pad assembly during operation, may cause the layers to separate, leading to failure of the brake system. A related disadvantage is that the resilient material between the metal plates may soften and extrude out from between the plates under high temperatures and pressures. A further disadvantage of these systems is that, unless the resilient layer is extremely thin, the brake pedal may feel soft or spongy during hard braking due to the compression of the elastic layer.

Vydra '034 and Passarella '962 relate to damping structures formed independently of the brake pad assembly and then joined thereto. Vydra '034 discloses a damping structure formed by providing a plurality of perforations in a layer of metal and then disposing a viscoelastic damping material into each perforation. The damping structure is adhesively joined to the backing plate either between the backing plate and the friction material or between the backing plate and the caliper. Passarella '962 discloses a vibration damper formed by coating two metal layers with adhesives and vibration absorbing coatings, stamping predetermined shapes from the metal layers, bonding the stamped shapes together, and then joining the structure to the backing plate by adhesive bonding and by securing metal tabs present on the structure to the backing plate.

A disadvantage of these prior art systems is that both are inefficient in that manufacturing the devices can be time intensive, and the manufacturing materials and tooling can be costly. A further disadvantage of Vydra '034 is that the damping structure is adhesively bonded to the backing plate, thus risking separation at high temperatures and shear stresses. A further disadvantage of Passarella '962 is that the vibration damper is not an integral part of the brake pad assembly and it may not be compatible with some brake systems, especially when used in conjunction with a replacement brake pad assembly.

Filderman '026 and '761, Melinat '615, and Furusu '962 are directed to multiple layer backing plates.

Filderman '026 and '761 both disclose backing plates comprising a stack of wholly metallic sheets which are contiguous to each other over their entire facing surfaces. The plates of the Filderman '026 backing plate are assembled together by gluing, welding, riveting, or crimping. Filderman '761 discloses an almost identical invention, but provides that at least some of the assembly means are moved to the edges of the plates. Both of these prior art references have the disadvantage of comprising wholly metallic elements; such elements do not effectively reduce vibrational noise. Filderman '026 specifically states that using the invention disclosed therein reduced noisy braking operations from 70 per 100 to 35 per 100. Thus, even using the Filderman inventions, one-third of all braking operations are noisy.

Melinat '615 discloses a backing plate comprising two metal plates with a ceramic heat barrier layer and a rubber compound layer disposed between them and a second rubber compound layer adhesively secured to the backing plate between the caliper and the backing plate. Each of the layers is adhesively bonded together and each contains openings so that the backing plate may be slidably mounted on pins. This prior art design suffers from the same disadvantages as Rath '555 and Thacker '685 in that the caliper bears directly against a layer of damping material. Another disadvantage of Melinat '615 is that the provision of mounting pins, although reducing the chance of layer separation due to shear stress on the adhesive, requires a specialized design for the brake housing. The design, therefore, cannot be used to replace worn brake pad assemblies without also replacing the whole brake housing. Still another disadvantage of Melinat '615 is that, like Odier '651 and Tillenburg '530, the brake pedal may feel soft or spongy during hard braking due to compression of the rubber compound layer.

Furusu '962 discloses a backing plate comprising three metal plates with a first damping layer adhesively bonded between the first and second metal plates and a second damping layer adhesively bonded between the second and third metal plates. Each of the two damping layers comprises a viscoelastic material with specific and different temperature dependant properties. A disadvantage of this prior art backing plate is that, like Odier '651 and Tillenburg '530, the adhesive bond between the layers may weaken and separate under the high temperatures and shear stresses associated with braking. A further disadvantage is that the specific materials to be used as damping layers may vary depending on the configuration of the brake pad assembly and the conditions under which the brake system will operate. Thus, costly and time-intensive experimentation may be necessary before different brake pad assembly models are manufactured in order to determine the optimum properties and composition of the materials to be used.

What is desired therefore is a brake pad assembly which suppresses brake squeal or noise, which does not degrade or deform due to caliper contact, which can be used without any modifications to existing brake systems, which does not produce a soft or spongy feel during hard braking, and which can withstand high temperatures and shear stresses without failure.

SUMMARY OF THE INVENTION

Accordingly, it is an object of the present invention to provide a brake pad assembly for use in vehicle disc brake systems which suppresses noise generated during operation.

Another object of the present invention is to provide a noise suppressing brake pad assembly which does not degrade or deform due to contact with the caliper.

Yet another object of the present invention is to provide a noise suppressing brake pad assembly which can be used in existing brake systems without modifying any system components.

A further object of the present invention is to provide a noise suppressing brake pad assembly which does not produce a soft or spongy feel during hard braking.

Still another object of the present invention is to provide a noise suppressing brake pad assembly which can withstand repeated periods of high temperature and shear stress without failure.

These and other objects are achieved by provision of a brake pad assembly having a split backplate design comprising a damping layer disposed between two metal plates which are mechanically fastened together such that the plates are slightly slidable relative to each other to allow independent vibration of the two plates.

The two metal plates are provided with a ratio of the thickness of the plate farther from the friction material to the plate closer to the friction material of at least about 1.50. The damping layer is formed of a non-compressible, non-metal, heatresistant material such as glass fiber cloth, mineral fiber cloth, ceramic fiber cloth, aramid fiber cloth, or graphite fiber cloth, and preferably has a low coefficient of friction which may be provided, e.g., by coating the fabric or fibers with material, such as polytetrafluoroethylene, sold under the trademark TEFLON by Dupont, or the like material. The cloth is preferably woven.

The plates are mechanically fastened together such that they are slidably movable relative to each other to an extremely small extent so that the plates may vibrate independently of each other. One such fastening means is to provide a plurality of pins projecting from a face of the metal plate farther from the friction material. The pins are passed through holes in the damping layer and the other plate and then crushed. Another embodiment of the invention provides for holes in both plates and the damping layer and employs external rivets for connecting the layers together instead of pins. Improvement in the overall noise and vibration damping capabilities of the assembly may be achieved by providing two plates formed from different metals.

The invention and its particular features and advantages will become more apparent from the following detailed description considered with reference to the accompanying drawings.

DETAILED DESCRIPTION OF THE INVENTION

Figure 1:
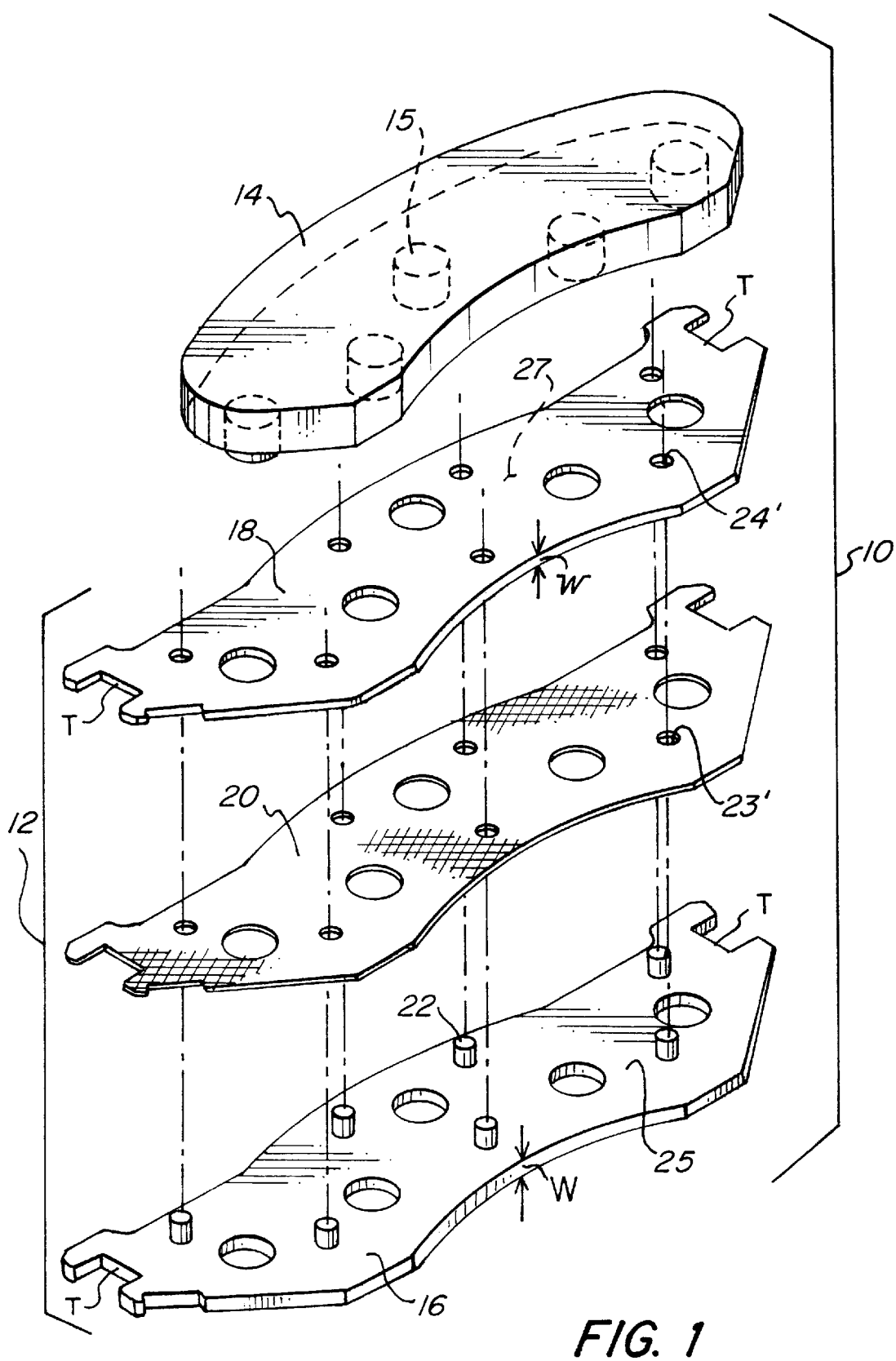
FIG. 1 is an isometric, exploded view of a brake pad assembly with a split backplate employing the pin and hole fastening means.

Referring to the drawings in detail, a brake pad assembly 10 comprising a split backplate 12, constructed in accordance with the present invention, and a pad of friction material 14 is shown. The pad of friction material 14 contains a plurality of protrusions 15 which flow into corresponding holes in the backplate 12 during molding. The protrusions 15 aid in securing the friction material 14 to the backplate 12.

Figure 2:
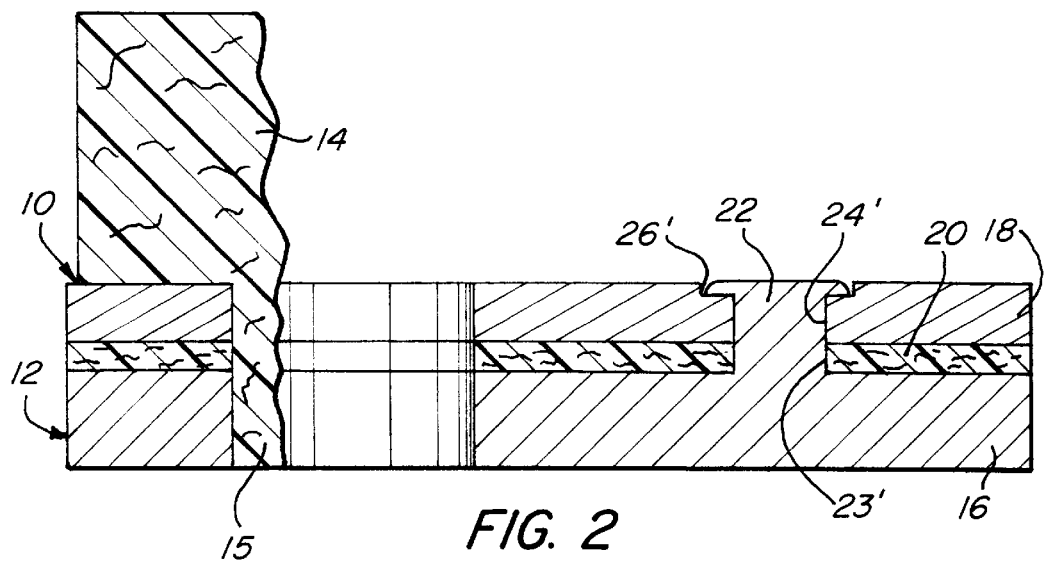
FIG. 2 is a cross-sectional view of the brake pad assembly of FIG. 1 with the friction material partially cut away.

Referring to FIGS. 1 and 2, the backplate 12 comprises a first metal plate 16 fastened to a second metal plate 18 with a damping layer 20 therebetween. Metal plates 16, 18 are illustrated with the same size and shape, but it is understood that the plates may also be provided with different relative shapes and/or sizes. However, it is important that plates 16, 18 line up exactly in the torque abutment areas T, so that the braking forces are transferred to the caliper by both plates 16, 18. If one of plates 16, 18 is protruding, it will bear the entire braking force, resulting in localized deformation.

First metal plate 16 and second metal plate 18 are preferably provided with different thicknesses so that they have different resonant frequencies. It is understood, however, that some noise suppressing advantage may be achieved by assemblies in which the split plates are provided with substantially the same thickness.

First metal plate 16 is preferably thicker than second metal plate 18, as illustrated in the Figures, to provide the stiffness necessary for mounting assembly 10 to a brake actuator (not shown). In this regard, a thickness w of second plate 18 ranges from between about one-half to one-sixth of the combined thickness (W+w) of first and second plates (16, 18). Thickness W of first plate 16 accordingly ranges from between about five-sixths to one-half of combined thickness (W+w).

Most preferably, a ratio of W to w is at least about 1.50, and the minimum thickness of second plate 18 is about 0.040".

The damping layer 20 is formed from a non-compressible, non-metal, heatresistant material such as glass fiber, mineral fiber, ceramic fiber, aramid fiber, or graphite fiber. Glass fiber cloth is currently preferred due to its extreme heat resistance, however, it is understood that other materials or other samples of the same materials exhibiting the required properties may also be used and may be preferred. To achieve noncompressibility, the fibers are preferably woven into cloth. The cloth may then be conveniently cut to the shape of plates 16, 18 but slightly smaller for neat sandwiching between plates 16, 18. The thickness of the damping layer 20 preferably ranges from between about 0.003" to about 0.005".

Figures 3A, 3B:
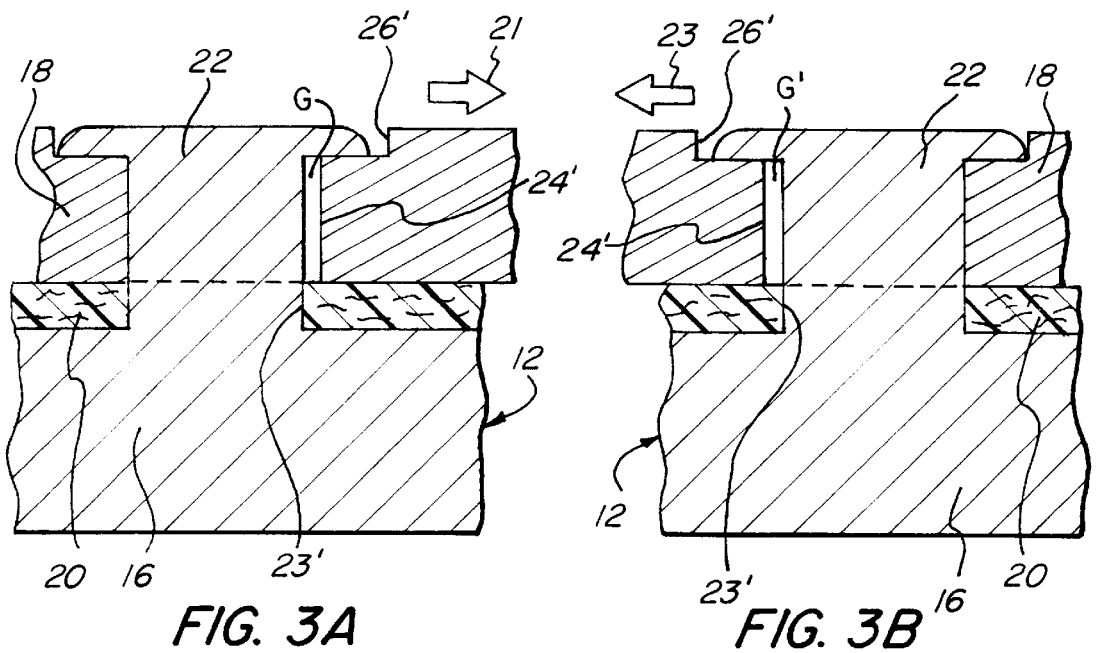
FIGS. 3A and 3B are enlarged, partial cross-sectional views of the brake pad assembly of FIG. 1 illustrating the slight sliding movability of the plates.

First metal plate 16 and second metal plate 18 are fastened together by a plurality of pins 22 such that the plates (16,18) are slightly slidable relative to each other, as is illustrated in FIGS. 3A and 3B. In FIG. 3A, second plate 18 is illustrated as having slid in the direction of arrow 21 relative to first plate 16 to create gap G. Conversely, in FIG. 3B, second plate 18 is illustrated as having slid in the direction of arrow 23 relative to first plate 16 to create gap G' on an opposite side of pin 22. It is understood that the gaps G and G' in FIGS. 3A and 3B are greatly exaggerated and that in operation the plates (16,18) slide relative to each other only to the extent caused by vibration.

By permitting relative motion of plates 16, 18, split back plate 12 effectively absorbs potentially noise producing vibration induced by the sliding of friction material 14 against the disc rotor (not shown). When the brakes are applied, plates 16, 18 are excited to various modes of vibration, such as bending and twisting. Because plates 16, 18 have different masses and thicknesses, and because they are not rigidly fastened together, the plates 16, 18 vibrate at their own characteristic frequencies in various mode shapes. This independent vibration of plates 16, 18 requires relative sliding of plates 16, 18 to various degrees at various locations on their faces. To promote this relative sliding and, therefore, independent vibration of plates 16, 18, intermediate damping layer 20 is preferably provided with a low coefficient of friction.

The low coefficient of friction is preferably provided by coating layer 20 or the fibers forming layer 20 with material, such as polytetrafluoroethylene, sold under the trademark TEFLON by Dupont, or a like material prior to assembly between plates 16, 18. It is understood that a sufficiently low coefficient of friction may also be provided without coating by carefully selecting the material forming damping layer 20. Another possibility is to coat inner surfaces 25, 27 of respective plates 16, 18 with low coefficient of friction material such as material, such as polytetrafluoroethylene, sold under the trademark TEFLON by Dupont, or the like.

In one embodiment of the present invention, illustrated in FIG. 1, pins 22 are extruded from a face of the first metal plate 16. The pins 22 are passed through corresponding holes 23',24' in the damping layer 20 and second metal plate 18 respectively and then crushed to fasten first metal plate 16 and second metal plate 18 together with the damping layer 20 therebetween. Counterbores 26' may be provided around holes 24' in second metal plate 18 so that the crushed pins are flush with the surface of second metal plate 18. In another, unillustrated embodiment, mechanical fastening means may also be used, such as external rivets, by providing aligned sets of holes in both plates.

During normal operation, i.e., when the brakes are applied, frictional sliding between the friction material 14 and the disc rotor (not shown) may cause vibrations. The present invention dampens these vibrations based on the principle that two bodies of different masses, different thicknesses and different materials possess different characteristic frequencies such that if the two bodies are fastened together, their vibrational frequencies interfere with and impede one another in such a way as to dampen vibration of the overall backplate 12 and thus of the overall brake pad assembly 10. The damping layer 20 facilitates noise suppression due to the presence of numerous air pockets in the material and by allowing the metal plates 16, 18 to vibrate independently.

The present invention avoids the disadvantages of the prior art while providing for a device which suppresses squeal or noise in brake pad assemblies. Since the portion of the backplate which the caliper engages is metal, the backplate will not significantly degrade or deform due to caliper contact. Moreover, because the damping layer is formed from a heat-resistant, non-compressible material, the brake pad assembly does not produce a soft or spongy feel during hard braking and the damping layer does not degrade at high temperatures and high loading. Further, since the metal plates are mechanically fastened together, the backplate can withstand high temperatures and shear stresses without failure.

In another aspect, the invention also comprises methods of assembling a split backplate 12 and brake pad assembly 10 for suppressing brake noise. The method includes the steps of providing plates, providing a damping layer, fastening the plates together with the damping layer therebetween, permitting the plates to slightly slide relative to each other so that the plates may vibrate independently of each other, and absorbing vibrations created during braking.

Fastening may comprise riveting the plates together, or extending pins from one plate and passing them through holes in the other. The damping layer is formed from fibers preferably woven into cloth. The fibers or cloth may be coated with low friction material to promote relative sliding of the plates.

Since certain changes may be made in the above-described device not departing from spirit of the invention, it is intended that all matter contained in the description or shown in the accompanying drawings shall be interpreted as illustrative and not in a limiting sense. Accordingly, reference should be made to the accompanying claims rather than the foregoing specification and drawings to determine the scope of the invention.

What is claimed is:

1. A backplate for noise suppression in brake pad assemblies comprising:

a first metal plate, said first metal plate having a plurality of holes;

a second metal plate, said second metal plate having a plurality of holes;

a non-compressible, non-elastic, non-metal layer disposed between said first and second metal plates for damping vibration of said first and second metal plates during operation, said damping layer formed of material selected from the group comprising polytetrafluoroethylene glass fiber, mineral fiber, ceramic fiber, aramid fiber, graphite fiber, and any combination thereof, said damping layer having a plurality of holes; and, a plurality of rivets passing through said holes in said first and second metal plates and said damping layer for fastening said first and second metal plates together with said damping layer therebetween such that said first and second metal plates are slightly slidable relative to each other and relative to said damping layer to allow independent vibration of said first and second metal plates.

2. A backplate for noise suppression in brake pad assemblies comprising:

a first metal plate;

a second metal plate, said second metal plate having a plurality of holes;

a non-compressible, non-elastic, non-metal layer disposed between said first and second metal plates for damping vibration of said first and second metal plates during operation, said damping layer formed of material selected from the group comprising polytetrafluoroethylene coated glass fiber, mineral fiber, ceramic fiber, aramid fiber, graphite fiber, and any combination thereof, said damping layer having a plurality of holes; and, a plurality of pins projecting from a face of said first metal plate, said pins passing through said holes in said second metal plate and said damping layer and then crushed to fasten said first and second metal plates together with said damping layer therebetween such that said first and second metal plates are slightly slidable relative to each other and relative to said damping layer to allow independent vibration of said first and second metal plates.

* * * * *